(12) United States Patent
Hoshi et al.

(10) Patent No.: US 6,900,939 B2
(45) Date of Patent: May 31, 2005

(54) POLARIZATION INSENSITIVE BEAM SPLITTING GRATING AND APPARATUS USING IT

(75) Inventors: Hikaru Hoshi, Tochigi (JP); Yasushi Kaneda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/372,538

(22) Filed: Feb. 24, 2003

(65) Prior Publication Data

US 2003/0161043 A1 Aug. 28, 2003

(30) Foreign Application Priority Data

Feb. 28, 2002 (JP) ........................................ 2002-052985

(51) Int. Cl.[7] .......................... G02B 5/18; G02B 27/44; G01J 3/18; H04J 14/02
(52) U.S. Cl. ......................... 359/569; 359/566; 398/84; 356/328; 250/237 G
(58) Field of Search ................................ 359/566, 569; 250/237 G; 356/328; 398/84

(56) References Cited

U.S. PATENT DOCUMENTS

| | | | |
|---|---|---|---|
| 4,362,359 A | | 12/1982 | Dammann et al. |
| 4,979,826 A | * | 12/1990 | Ishizuka et al. ......... 250/237 G |
| 5,101,102 A | | 3/1992 | Nishimura et al. |
| 5,541,729 A | * | 7/1996 | Takeuchi et al. ........ 250/237 G |
| 2001/0017350 A1 | | 8/2001 | Ishizuka |
| 2002/0135876 A1 | * | 9/2002 | Holm et al. ................ 359/569 |
| 2003/0076594 A1 | * | 4/2003 | Kramer ...................... 359/569 |

FOREIGN PATENT DOCUMENTS

| | | |
|---|---|---|
| EP | 1 130 422 A1 | 9/2001 |
| JP | 2001-242314 | 9/2001 |
| WO | WO 03/062870 | 7/2003 |

OTHER PUBLICATIONS

Microposit® S1800® Photoresists, product data sheet MPR S1800 1093, Shipley Company, Inc., Newton, MA, © 1993.*
A communication from European Patent Office for Appl. No. 03251166.9 dated Oct. 7, 2004.
Lowen E G et al., "Diffraction Gratings and applications" Optical Engineering Series, 1997 pp. 179–182.
Nguyen H T et al., "High–Efficiency Fused–Silica Transmission Gratings" Optics Letters, Optical Society of America, Washington, US, vol. 22, No. 3, Feb. 1, 1997 pp. 142–144.
Herwig Logelnik, "Coupled Wave Theory for Thick Hologram Gratings", The Bell System Technical Journal, vol. 48, Nov. 1969, p. 2923.

* cited by examiner

Primary Examiner—John Juba, Jr.
(74) Attorney, Agent, or Firm—Morgan & Finnegan, L.L.P.

(57) ABSTRACT

A beam splitting element having a diffraction grating is designed by careful selection of device parameters such as grating period, duty cycle, depth and refractive index. In particular, the parameters are selected in such a way that the product of refractive index, depth and duty cycle is equal to or bigger than a predetermined value. The diffraction grating device designed by these rules exhibits a high diffraction efficiency and small polarization dependence.

8 Claims, 13 Drawing Sheets

PRIOR ART

PRIOR ART

Diffraction efficiency (+1)
Dependence on wavelength ($\theta = 0$ degree)

PRIOR ART

POLARIZATION INSENSITIVE BEAM SPLITTING GRATING AND APPARATUS USING IT

BACKGROUND OF THE INVENTION

1. Field of the Invention

The present invention relates to a beam splitting element suitable for a optical demultiplexer, a spectrophotometer, an optical measuring apparatus, or the like.

2. Description of the Related Art

Recently, a band-pass filter composed of a dielectric multilayer film and a diffraction optical element such as a diffraction grating, or a hologram are known as beam splitting elements each of which splits an optical signal, including a plurality of wavelengths, into a plurality of luminous fluxes with different wavelengths.

Such a beam splitting element has been studied for about use in various forms, for example, as a key device of a wavelength division multiplexing system. In a wavelength-division multiplex mode (WDM) of the optical communication, there is light with a plurality of different wavelengths used in a determined wavelength band. Nevertheless, when the volume of treated information becomes large, many rays of light with wavelengths used in a determined wavelength band are needed. Hence, wavelength intervals between the used wavelengths become excessively narrow in the wavelength band. Therefore, a beam splitting element that uses a diffraction optical element such as a diffraction grating is looked upon with great hope.

Here, the principle of beam splitting by a diffraction grating will be described.

It is known that it is possible to calculate an expression for finding a diffraction angle θ' of a m-th order diffracted light, exited from the diffraction grating, from the following expression.

$$n \cdot \sin\theta - n' \cdot \sin\theta' = m\lambda/p \quad (1)$$

where, n: refraction index of incident-side medium,
n': refraction index of outgoing-side medium,
θ: incident angle,
θ': diffraction angle of m-th order diffracted light,
m: order number of diffraction,
λ: wavelength of incident light (incident wavelength), and
p: grating period (pitch).

As seen from Expression (1), when an incident angle θ is constant in a diffraction grating, a diffraction angle of the m-th order diffracted light is varied according to a wavelength λ of the incident light.

For example, when n=1.5, n'=1.0, θ=0°, m=1, p=100 μm, λ1=1.550 μm, and λ2=1.600 μm, a first order diffraction angle θ' (λ1) of light with a wavelength of λ1 and the first order diffraction angle θ' (λ2) of light with a wavelength of λ2 become θ' (λ1)=0.8881°, and θ' (λ2)=0.9168° respectively.

In this manner, difference Δθ' (this is called the splitting angle) between diffraction angles of respective rays of incident light at the time when wavelength difference Δλ (=λ2−λ1) between rays of incident light is 50 nm becomes, $$\Delta\theta' = \theta'(\lambda 2) - \theta'(\lambda 1) = 0.0287°.$$

In order to perform excellent beam splitting with a diffraction grating, it is necessary to achieve a large splitting angle Δθ', or to enlarge the physical distance between the diffraction grating and a split light-receiving section. Nevertheless, the latter method is not preferable because of drawbacks such as a large mounting package, and a complicated mechanism. Therefore, a diffraction grating with a larger splitting angle Δθ' is requested.

On the other hand, in a wavelength-division multiplex mode (WMD) of optical communication, as described above, when the volume of treated information becomes large, it is necessary to significantly lessen (narrow) wavelength difference Δλ between a plurality of light sending different signals in a determined wavelength band. Specifically, it is not rare that the wavelength difference Δλ becomes less than 1 nm.

For example, when n=1.5, n'=1.0, θ=0°, m=1, λ1=1.550 μm, λ2=1.551 μm, that is, Δλ=0.001 μm (=1 nm), a grating period p that satisfies Δθ'=0.085° becomes p=1.69 μm from Expression (1). In order to obtain a desired splitting angle when the wavelength difference is small, a diffraction grating with an extremely small period that is about a wavelength of incident light is necessary.

In a region (λ<<p) where the grating period p is sufficiently large to the incident wavelength λ, it is well known to be able to obtain a diffraction efficiency according to a scalar diffraction theory in diffraction grating, and for example, it is mentioned in "Kaisetu-kougaku-sosi-nyuumon (Introduction to diffraction optical element", Optoronics Co., Ltd., p.64. According to the scalar diffraction theory, a diffraction efficiency is varied according to the number of steps when a grating shape is a multilevel-stepped one, and when the numbers of step levels are 2, 4, 8, 16, and ∞, the maximum values (theoretical values) of the diffraction efficiencies are 40.5%, 81.1%, 95.0%, 98.7%, and 100% respectively.

However, in a region (λ≈p) where the grating period p is similar to the incident wavelength λ, a diffraction efficiency reduces in comparison with a diffraction efficiency calculated from the scalar diffraction theory. In general, this region is called a resonance region, and it is known that phenomena such as the reduction and polarization dependence of the diffraction efficiency happen. When the diffraction efficiency of a diffraction grating in the resonance region is found, it is possible to strictly calculate it by using a vector analysis method such as a rigorous coupled wave analysis method (RCWA).

This will be described by using concrete examples. FIG. 11 shows a conventional diffraction grating (eight-step multilevel diffraction grating), whose design values as a diffraction grating are set as grating material: $SiO_2$ (n=1.44), outgoing-side medium: air (n'=1.00), grating period: p=1.69 μm, total grating depth: d(total)=3.01 μm, incident angle: θ=0°, and design wavelength: λ0=1.550 μm.

In such an eight-step multilevel diffraction grating, a maximum value (theoretical value) of the diffraction efficiency calculated from the scalar diffraction theory is about 95%. Nevertheless, this theoretical value does not include the loss of surface reflection (Fresnel reflection) etc.

On the other hand, FIG. 12 shows the wavelength dependence of the diffraction efficiency calculated according to RCWA. The diffraction efficiency of a plus first order diffracted light at the design wavelength λ0 (=1.550 μm) is about 47% from FIG. 12, and hence, it is understood that the diffraction efficiencies are lowered in both TE polarized light and TM polarized light (the detail will be described later though the definition of the TE polarized light and TM polarized light is shown in FIG. 2). In addition, FIG. 13 shows the diffraction efficiency in the case of a similar eight-step multilevel diffraction grating, whose design values are set as grating material: SiO$_2$ (n=1.44), outgoing-side medium: air (n'=1.00), grating period: p=1.69 µm, total grating depth: d(total)=2.24 µm, incident angle: θ=0°, and design wavelength: λ0=1.550 µm. In this case, although the diffraction efficiency to TE polarized light is improved in comparison with the case in FIG. 11, the diffraction efficiencies to the TE polarized light and TM polarized light are largely different. In FIG. 13, the diffraction efficiencies of the plus first order diffracted light at the design wavelength (λ0=1.55 µm) are about 65% to the TE polarized light, and about 40% to the TM polarized light.

Hence, it is understood that, if a large splitting angle is achieved by reducing the grating period, the reduction and polarization dependence (difference between diffraction efficiencies to the TE polarized light and TM polarized light) of the diffraction efficiency arise. In particular, it is difficult in a two-step binary diffraction grating with periods in one direction whose number of grating steps is less than that of a multilevel diffraction grating to reduce the polarization dependence with achieving the high diffraction efficiency.

In addition, as a beam splitting element that is well known generally, there is a hologram element using the Bragg diffraction besides the above-mentioned diffraction grating. Detailed explanation concerning the hologram element is mentioned in, for example, the Bell System Technical Journal, vol.48, No.9, 1969. According to this, when the Bragg condition is nearly satisfied, it is possible to approximate the diffraction efficiency of a first order diffracted light at the design wavelength λ0 by the following expression in the case that the grating vector of the hologram element is parallel to a surface of the hologram.

$$\eta(\text{1st degree}) = \sin^2(\pi \Delta n 1 d 1 / \lambda 0 \cos \theta) \quad (2)$$

where definitions are η(1st order): first order diffraction efficiency, Δn1: variance of refraction index in hologram layer, d1: hologram thickness, λ0: design wavelength, and θ: incident angle in hologram.

According to Expression (2), a condition that the first order diffraction efficiency η(1st order) becomes a maximum is to satisfy πΔn1d1/λ0 cos θ=π/2, and the diffraction efficiency theoretically becomes 100% at this time.

Nevertheless, since the periodic structure of a refraction index is achieved in a general hologram element by using material such as a photopolymer or bichromated gelatin, the refractive index difference Δn1 is near 0.02 to 0.04, and hence, a sufficient diffraction efficiency cannot be obtained unless the hologram thickness d1 is set to be large. As a result, there was a problem that, since it became a hologram element with extremely large element thickness, incident wavelength dependence and incidence angle dependence to the diffraction efficiency also became large.

In this manner, it was difficult in a predetermined wavelength band to achieve a beam splitting element, which has a high diffraction efficiency and low polarization dependence, with a conventional diffraction grating or a conventional hologram element. In particular, this was a serious problem when a large splitting angle was necessary.

SUMMARY OF THE INVENTION

The present invention aims to provide a beam splitting element that improves the reduction and polarization dependence of a diffraction efficiency with achieving a desired splitting angle.

One of the embodiments of the present invention is a beam splitting element using a two-step binary diffraction grating with periods in one direction that nearly satisfies the Bragg condition and reduces the polarization dependence. There is no particular limitation in the usage of this beam splitting element, but, when a large splitting angle is required, this beam splitting element is expected to largely improve diffraction efficiency and polarization dependence in comparison with a conventional diffraction grating, and is particularly useful.

Specifically, in a beam splitting element that splits the luminous flux, made incident to a diffraction grating, into a plurality of luminous fluxes according to wavelengths, the beam splitting element satisfies the following condition:

$$n \cdot d \cdot w / p \geq 0.670 (\mu m)$$

where a refraction index of grating material of the diffraction grating is n, grating depth is d, a grating period is p, and grating width is w. And also, the grating period p satisfies the following condition:

$$\lambda 0 / (n \cdot \sin \theta + n') < p \leq 2 \cdot \lambda 0 / (n \cdot \sin \theta + n')$$

where a design wavelength is λ0, an incident angle is θ, and a refraction index of an outgoing-side medium is n'.

A more detailed description will be provided later in the embodiment.

DETAILED DESCRIPTION OF THE PREFERRED EMBODIMENTS

Hereafter, respective embodiments of the present invention will be described by using the drawings.

(Embodiment 1)

Figure 1:
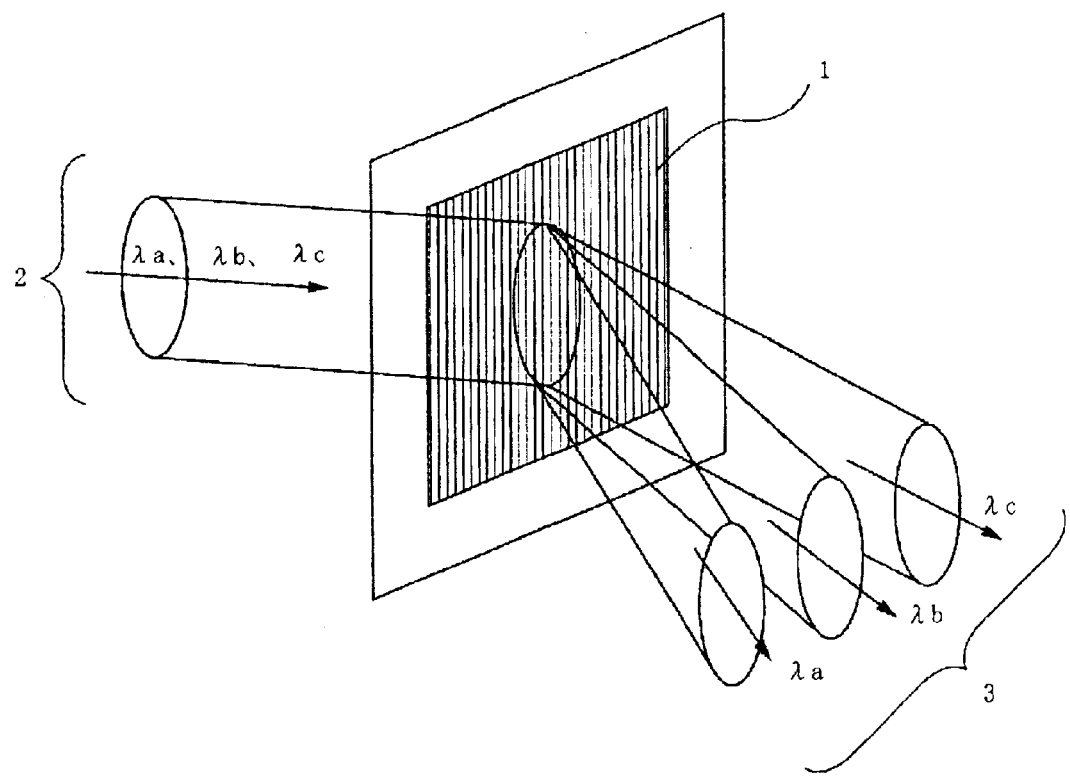
FIG. 1 is an explanatory diagram of a beam splitting element according to Embodiment 1 of the present invention.

FIG. 1 is an explanatory diagram of a beam splitting element according to Embodiment 1 of the present invention. In the diagram, a beam splitting element 1 is composed of a diffraction grating with the construction described later in detail. An incident luminous flux 2 includes luminous fluxes with three different wavelengths of $\lambda a$, $\lambda b$, and $\lambda c$ in a predetermined wavelength band. An outgoing luminous flux 3 is split into three luminous fluxes every wavelength by a diffraction action of the diffraction grating constituting the beam splitting element 1. The beam splitting element according to this embodiment is suitably used for an optical demultiplexer, a spectrophotometer, an optical measuring apparatus, and the like described in the following description of other embodiments.

Figure 2:
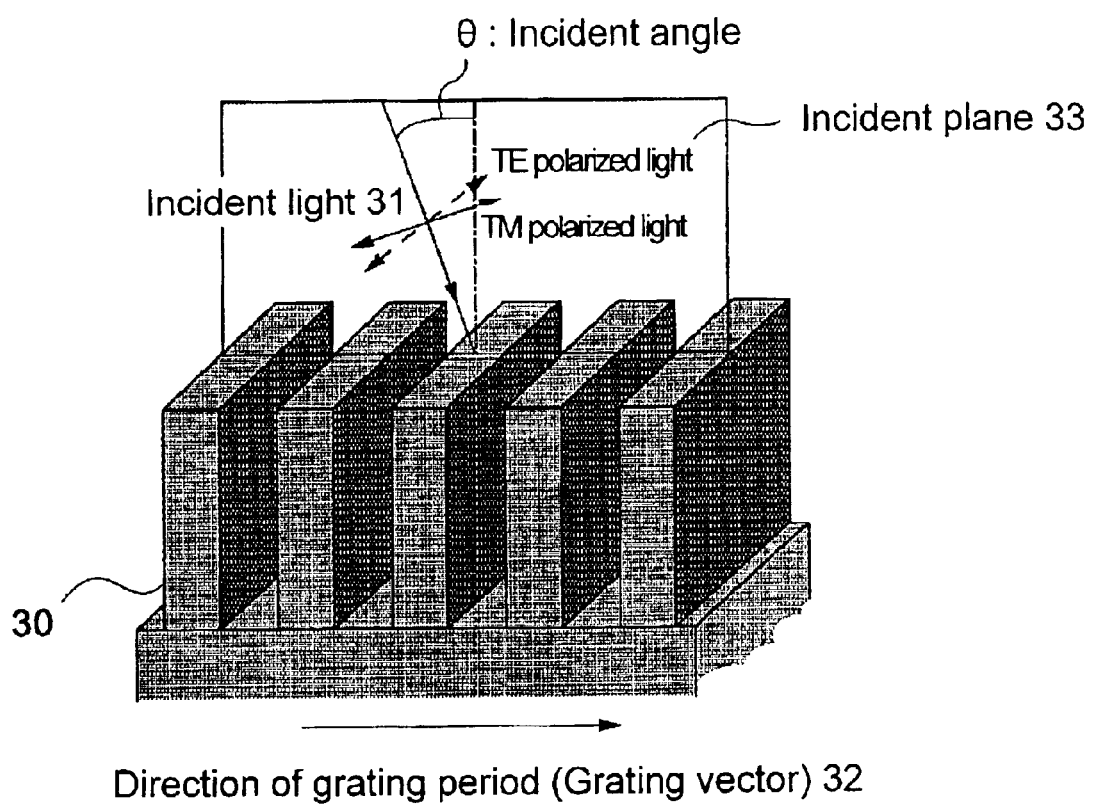
FIG. 2 is an explanatory diagram of the definition of TE polarized light and TM polarized light.

FIG. 2 is an explanatory diagram of the definition of TE polarization and TM polarization of light entering into a diffraction grating. In FIG. 2, reference numeral 30 denotes a diffraction grating, numeral 31 shows incident light, and numeral 32 shows a direction of a grating period of the diffraction grating (grating vector). When a plane where the incident light 31 and grating vector 32 are included is an incident plane 33, a polarized direction perpendicular to the incident plane 33 is defined as TE polarization, and a polarized direction orthogonal to the incident light 31 in the incident plane is defined as TM polarization.

Figure 3:
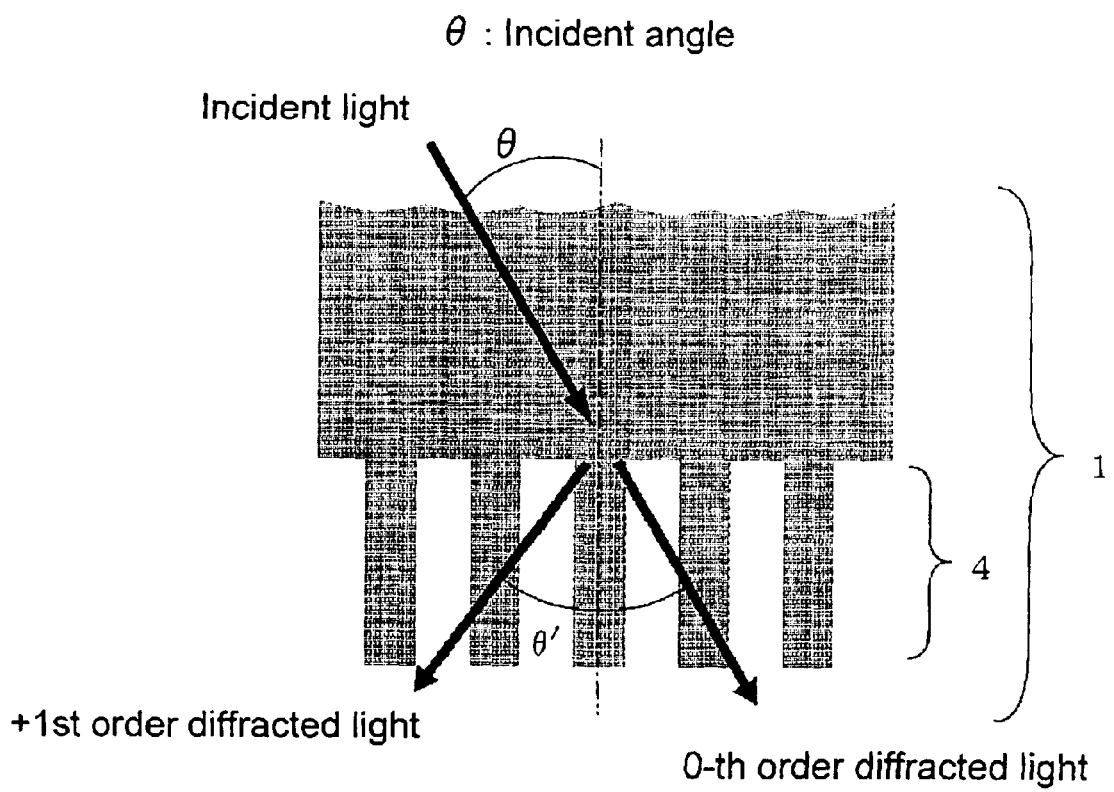
FIG. 3 is an explanatory diagram of the definition of an incident angle and a diffraction angle.

FIG. 3 is a diagram for describing the definition of signs of an incident angle and a diffraction angle in this embodiment. It is defined that a counterclockwise direction to the normal line of the incident plane (the paper face of FIG. 3) is positive. Therefore, the sign of the incident angle $\theta$ in FIG. 3 is positive, and the sign of the diffraction angle $\theta'$ of the plus first order diffracted light that is transmitted is negative.

Figure 4:
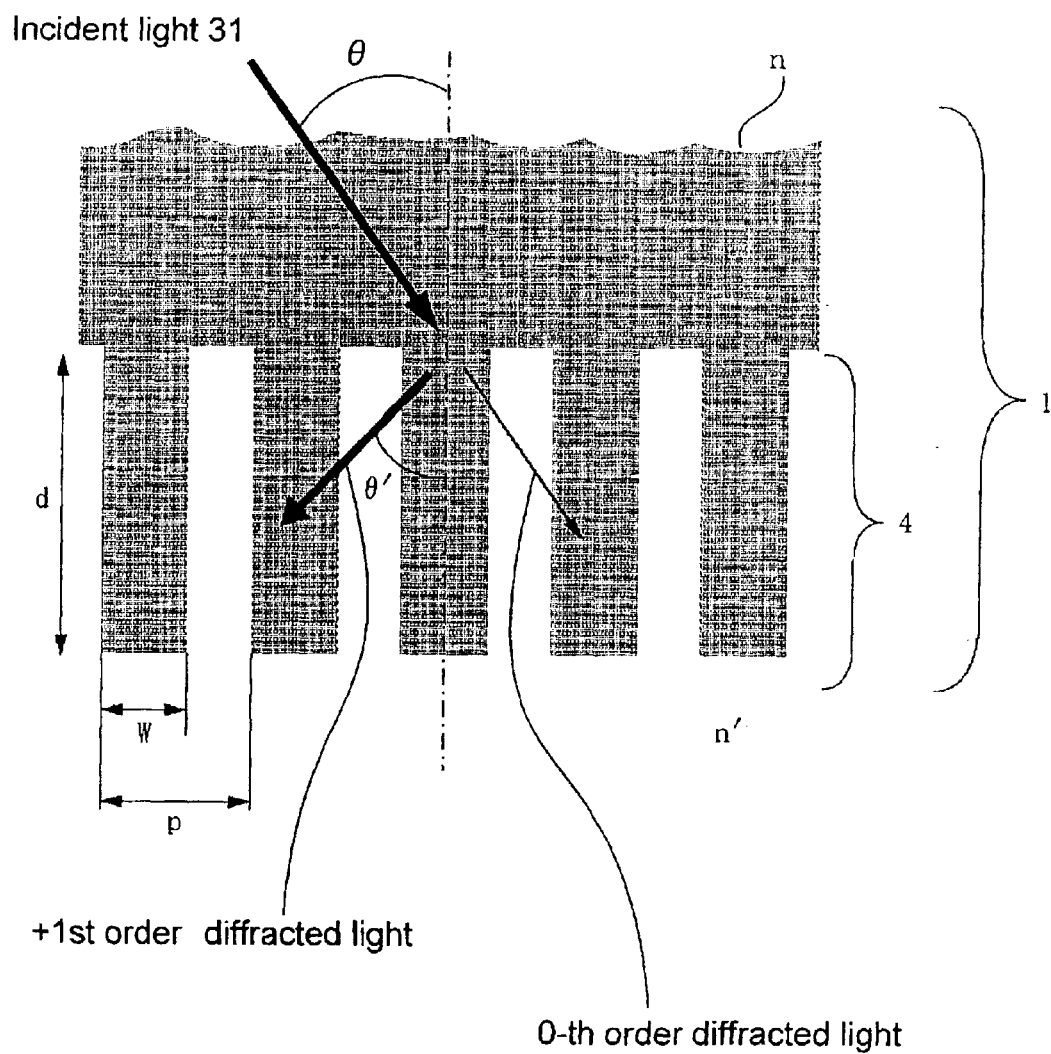
FIG. 4 is a sectional view of the diffraction grating construction in the beam splitting element according to Embodiment 1.

FIG. 4 is a diagram showing the diffraction grating construction of the beam splitting element 1 according to this embodiment. In the diagram, reference numeral 4 denotes a grating section. A grating period of the grating section 4 is p, the width of the grating is w, and the depth of the grating is d. The incident light 31 enters from the opposite side of the grating section 4 to the beam splitting element 1 at the incident angle $\theta$. A refraction index of the grating material that is an incident-side medium is n, and a refraction index of air that is an outgoing-side medium is n'.

When the incident light 31 enters into the beam splitting element 1, a zero-th order diffracted light and a first order diffracted light are generated. Since the incident light 31 includes luminous fluxes with three different wavelengths of $\lambda a$, $\lambda b$, and $\lambda c$, rays of diffracted light of the luminous fluxes with respective wavelengths are generated. Nevertheless, since the value of the first order diffraction angle $\theta'$ is varied according to wavelengths of $\lambda a$, $\lambda b$, and $\lambda c$, the luminous flux with respective wavelengths is split and exited as shown in FIG. 1.

In comparison of diffraction grating with the hologram element, it is possible to enlarge refractive index difference $\Delta n$ between the refraction index n of the incident-side medium and the refraction index n' of the outgoing-side medium. For example, when it is assumed that the incident-side medium is a diffraction grating formed on a quartz substrate ($SiO_2$: n=1.444) and the outgoing-side medium is air (n'=1.000), $\Delta n$ becomes about 0.444. As a result, since it becomes possible to greatly thin the thickness of the beam splitting element in comparison with the case of using the hologram element as the beam splitting element, it is possible to lessen the change of the diffraction efficiency when the incident wavelength and incident angle change.

Further more, even in such a thin diffraction grating, by nearly satisfying the Bragg condition by optimizing the grating depth d of the diffraction grating as described later, a high diffraction efficiency is obtained.

In addition, it is necessary to reduce the grating period at an incident wavelength level when a large splitting angle $\Delta\theta'$ is necessary in small wavelength difference $\Delta\lambda$. But, in the case of such grating structure in a fine period, there are problems that the diffraction efficiency reduces and that strong polarization dependence appears. Since this is a phenomenon that happens even when the number of steps of a multilevel diffraction grating is made large, it was difficult to avoid this in the conventional grating structure.

In this embodiment, a beam splitting element that has a high diffraction efficiency of diffracted light and small polarization dependence of the diffracted light (difference between diffraction efficiencies of TE polarized light and TM polarized light) is achieved by optimizing the grating construction. Specifically, the refraction index n of grating material of the diffraction grating, the grating depth d, and a rate w/p of the grating width w to the grating period p are designed so as to satisfy the following condition.

$$n \cdot d \cdot w/p \leq 0.67 (\mu m) \tag{3}$$

Owing to this, the beam splitting element having a high diffraction efficiency, and small polarization dependence while obtaining the desired splitting angle is achieved. Since it is difficult to design the difference between diffraction efficiencies of the TE polarized light and TM polarized light in the design wavelength $\lambda 0$ at about 10% or less if the conditional expression (3) is not satisfied, the polarization dependence deteriorates.

For example, when a grating is set to be grating material: $SiO_2$ (n=1.470), outgoing-side medium: air (n'=1.000), grating period: p=0.31 $\mu$m, total grating depth: d=0.65 $\mu$m, incident angle: $\theta=25°$, design wavelength: $\lambda 0=0.40 \mu$m, and ratio of grating section w to grating period p: w/p=0.7, n·d·w/p=0.669, and hence, the conditional expression (3) is not satisfied. At this time, since the diffraction efficiency of the plus first order diffracted light of the TE polarized light is about 76% and the diffraction efficiency of the plus first order diffracted light of TM polarized light becomes about 65%, the diffraction efficiency difference between the plus first order diffracted light of the TE polarized light and the plus first order diffracted light of the TM polarized light is about 11%. It can be seen from this that it is preferable to satisfy the conditional expression (3) so as to reduce the diffraction efficiency difference that depends on the polarized direction of the incident light with when assuming the optical action in a wide wavelength region from a visible light region to an infrared light region.

In addition, the grating period p is set so as to satisfy the following condition at the design wavelength $\lambda 0$ of the diffraction grating and the incident angle $\theta$ to the diffraction grating in this embodiment.

$$\lambda 0/(n \cdot \sin\theta + n') < p \leq 2 \cdot \lambda 0/(n \cdot \sin\theta + n') \tag{4}$$

Owing to this, since only the first order diffracted light and zero-th order diffracted light exist, it is possible to increase the original required diffraction efficiency of the first order diffracted light.

A diffraction grating according to this embodiment has the construction of a two-step binary diffraction grating with periods in one direction and is set to be grating material: SiO$_2$ (n=1.444), outgoing-side medium: air (n'=1.000), grating period: p=1.36 μm, total grating depth: d=3.3 μm, incident angle: θ=22°, and design wavelength: λ0=1.550 μm, and hence, a ratio of grating section w to the grating period p, w/p=0.6. Hence, since n·d·w/p=2.86, the conditional expression (3) is satisfied.

A diffraction angle of the plus first order diffracted light at this time is θ'=−36.8° from Expression (1). More over, a splitting angle Δθ at the time of the incident wavelength changes by 1 nm is Δθ=0.055°.

In addition, it is common up to now to set the rate w/p of the grating width w to the grating period p at about 0.5, but, by introducing w/p into design parameters so as to satisfy the conditional expression (3), the polarization dependence on the TE polarized light and TM polarized light is further reduced. Though a value of w/p is not restricted particularly, it is preferable to satisfy 0.2≦w/p≦0.8 as the construction that the diffraction grating can be produced.

Figure 5:
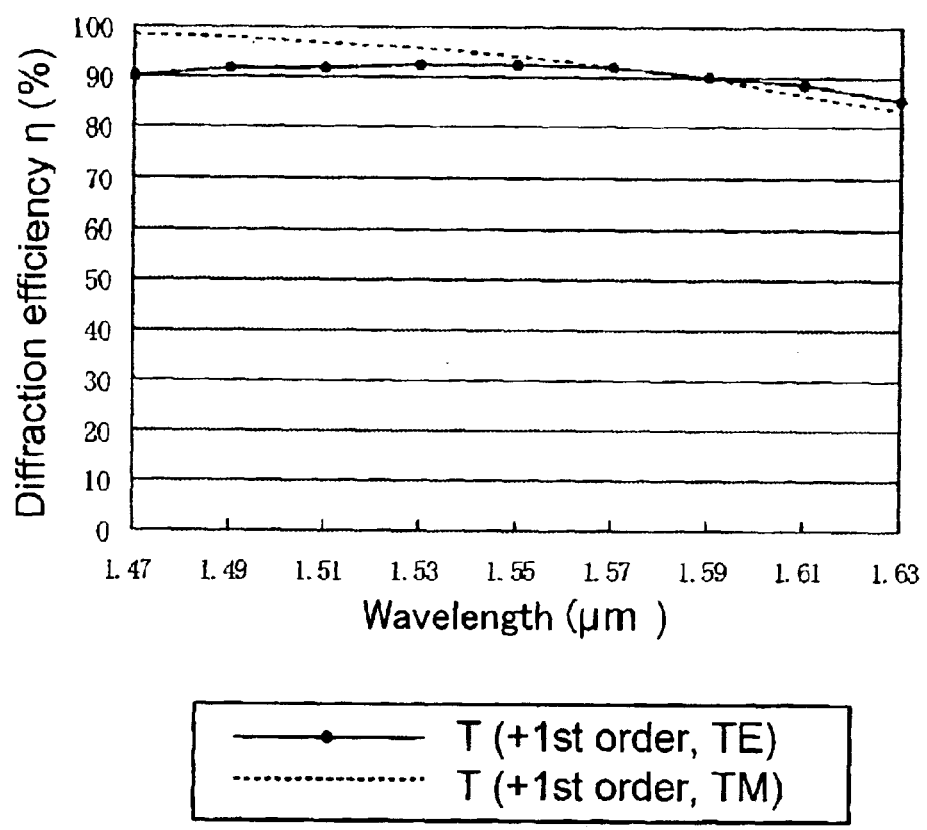
FIG. 5 is a graph showing the wavelength characteristic of the diffraction efficiency relating to the plus first order diffracted light in the beam splitting element according to Embodiment 1.

FIG. 5 shows the diffraction efficiency of the plus first order diffracted light according to this embodiment described above. The diffraction efficiencies of the plus first order diffracted lights of both TE polarized light and TM polarized light achieve about 85% or more in a wavelength band of 1.47 μm to 1.63 μm, and they are about 92% at the design wavelength λ0=1.55 μm, which is an excellent diffraction efficiency.

By the way, since a small quantity of the zero-th order diffracted light, which is transmitted, and reflective diffracted light besides the plus first order diffracted light that is transmitted is generated, the total of all these diffraction efficiencies naturally becomes 100%. In addition, since the difference between diffraction efficiencies of the TE polarized light and TM polarized light is controlled to about 7% at the maximum, the polarization dependence is reduced even in a full region of used wavelengths. The diffraction efficiency obtained by averaging the polarized light achieves about 85% at the minimum.

Actually, since there is a possibility that several percent of the light quantity loss arises because Fresnel reflection arises on a surface of the element, it is preferable to take measures of suppressing the Fresnel reflection such as anti-reflection coating films on surfaces of an element substrate and the grating in the incident side.

In addition, since it is possible to use lithography technique and the like in conventional semiconductor process when producing the diffraction grating according to this embodiment, it is possible to produce the diffraction grating easily. Moreover, since it is easy to produce a diffraction grating because it has the construction of a two-step binary diffraction grating with periods in one direction and it is also possible to produce it at a small number of steps, it is possible to achieve it at a low cost.

(Embodiment 2)

A beam splitting element according to Embodiment 2 will be described.

Since the beam splitting element according to this embodiment is a design example in the case that a splitting angle of diffracted light is made large in comparison with Embodiment 1 and its usage is similar to that of Embodiment 1, its explanation will be omitted. A diffraction grating of a beam splitting element according to this embodiment has a two-step binary diffraction grating with periods in one direction and is set to be grating material: SiO$_2$ (n=1.444), outgoing-side medium: air (n'=1.000), grating period: p=1.10 μm, total grating depth: d=4.00 μm, incident angle: θ=30°, and design wavelength: λ0=1.550 μm, and hence, a ratio of grating section w to the grating period p, w/p is 0.6. Hence, since n·d·w/p=4.04, the conditional expression (3) is satisfied.

A diffraction angle of the plus first order diffracted light at this time is θ'=−43.6°. A splitting angle Δθ at the time of the incident wavelength changing by 1 nm is Δθ=0.072°.

Figure 6:
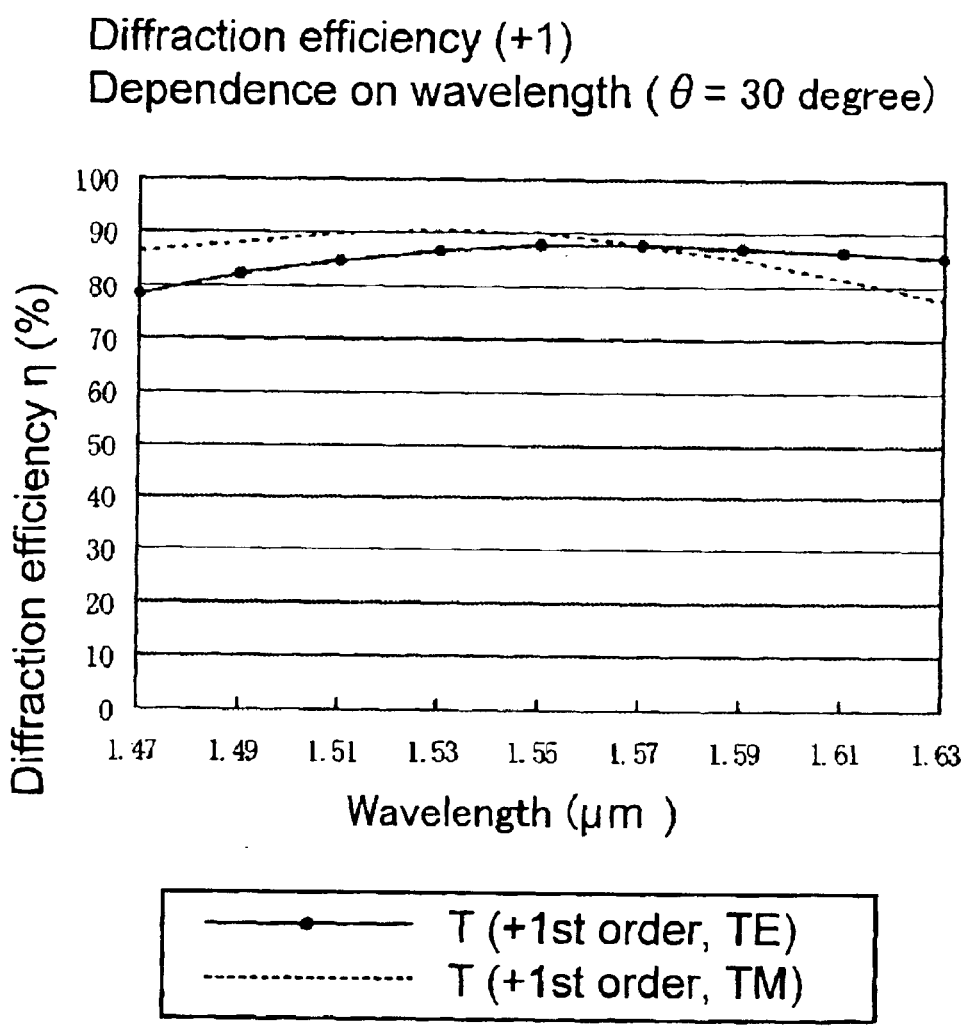
FIG. 6 is a graph showing the wavelength characteristic of the diffraction efficiency relating to the plus first order diffracted light in a beam splitting element according to Embodiment 2 of the present invention.

FIG. 6 shows the diffraction efficiency of the plus first order diffracted light, which is transmitted, in the above-mentioned construction. The diffraction efficiencies of the plus first order diffracted lights of both TE polarized light and TM polarized light achieve about 78% or more in a wavelength band of 1.47 μm to 1.63 μm, and they are about 90% at the design wavelength λ0=1.55 μm, which is an excellent diffraction efficiency.

In addition, since the difference between diffraction efficiencies of the TE polarized light and TM polarized light is controlled to about 7% at the maximum, the polarization dependence is reduced even in a full region of used wavelengths. The diffraction efficiency obtained by averaging the polarized light achieves about 83% at the minimum.

(Embodiment 3)

In Embodiment 3, an optical demultiplexer that uses a beam splitting element like those described in Embodiments 1 and 2 will be described.

Figure 7:
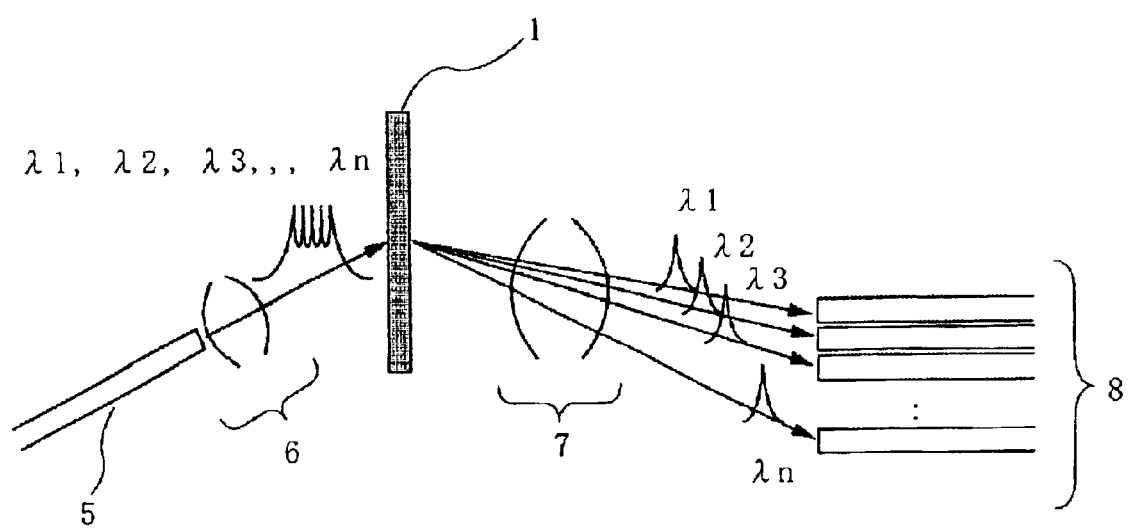
FIG. 7 is a schematic diagram of an optical demultiplexer that uses a beam splitting element according to Embodiment 3 of the present invention.

FIG. 7 is a schematic diagram of the optical demultiplexer according to this embodiment. In FIG. 7, reference numeral 1 denotes a beam splitting element like those described in Embodiments 1 and 2, numeral 5 shows an optical fiber, numeral 6 shows a collimator lens, numeral 7 shows a condenser lens, and numeral 8 shows an optical fiber array.

An incident light including the light with a plurality of wavelengths of λ1, λ2, λ3, . . . , λn exited from the optical fiber 5 is converted into parallel light by the collimator lens 6, and thereafter, it enters into the beam splitting element 1 at an incident angle θ. After the light incident into the beam splitting element 1 is exited at different diffraction angles θ' (λn) depending on the wavelengths, they are condensed by the condenser lens 7 to enter into the optical fiber array 8, arranged in the vicinity of its focus, while being spatially split.

Since the optical demultiplexer according to this embodiment can spatially split a lot of wavelengths at the same time by making optical fibers, arranged in the exiting side of the beam splitting element, an array, it is possible to apply it to optical multi-communication etc.

(Embodiment 4)

In Embodiment 4 of the present invention, a spectrophotometer that uses a beam splitting element like those described in Embodiments 1 and 2 will be described.

Figure 8:
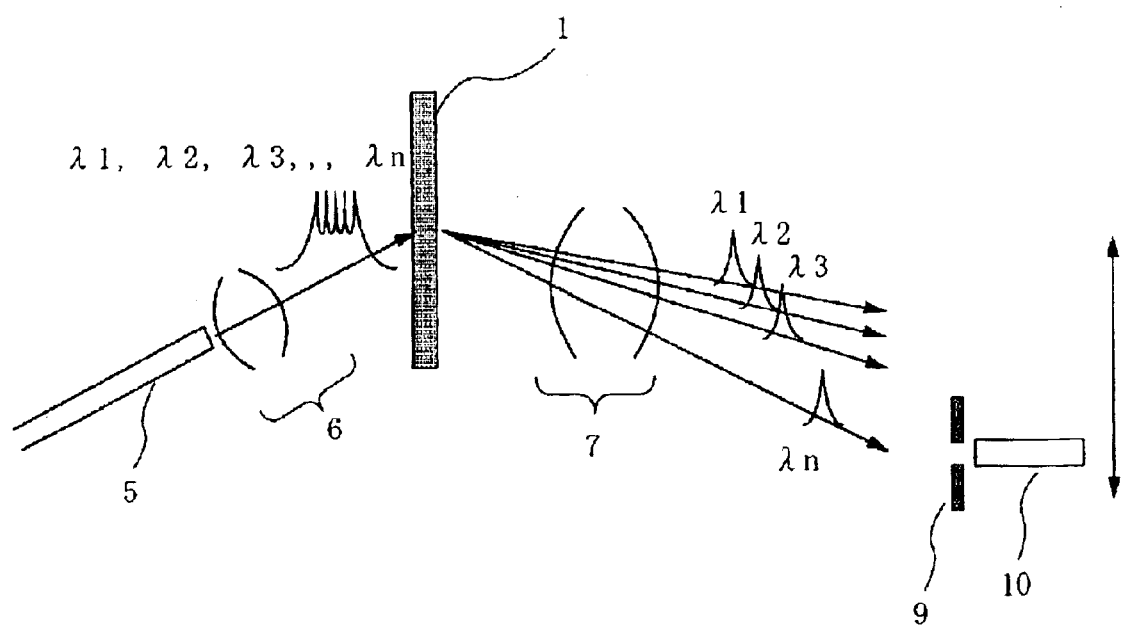
FIG. 8 is a schematic diagram of a spectrophotometer that uses a beam splitting element according to Embodiment 4 of the present invention.

FIG. 8 is a schematic diagram of the spectrophotometer according to this embodiment. In FIG. 8, reference numeral 1 denotes a beam splitting element like those described in Embodiment 1 and 2, numeral 5 shows an optical fiber, numeral 6 shows a collimator lens, numeral 7 shows a condenser lens, numeral 9 shows a slit plate, and numeral 10 shows a photodetector. The spectrophotometer according to this embodiment is an apparatus to measure the optical characteristics of the optical fiber 5.

An incident light including a plurality of wavelengths of λ1, λ2, λ3, . . . , λn exited from the optical fiber 5 is converted into parallel light by the collimator lens 6, and thereafter, it enters into the beam splitting element 1 at an incident angle θ. After the light incident into the beam splitting element 1 is exited at different diffraction angles θ' (λn) depending on the wavelengths, they are condensed by the condenser lens 7. Since stray light except a wavelength, which is desired to be detected, among light with various wavelengths is shaded by the slit plate 9, only the light of the wavelength that is desired to be detected enters into the photodetector 10 by passing through an aperture of the slit plate 9. It is possible to measure the optical characteristics of the optical fiber 5 by moving positions of the slit plate 9 and photodetector 10 integrally.

Though FIG. 8 is an explanatory diagram where the slit plate 9 and photodetector 10 are moved, the present invention is not limited to this, but it is also possible to perform beam splitting, for example, by rotating the beam splitting element 1 with fixing the photodetector 10.

Though there are various types such as a single-mode fiber, a multimode fiber, and a polarization plane retaining fiber in recent optical fibers, it is possible to provide a highly effective spectrophotometer that has high resolution and can perform beam splitting by using the beam splitting element according to the present invention, and further does not have diffraction efficiency dependence on the polarization direction.

Here, though the optical measurement of an optical fiber is exemplified, the present invention is not limited to this, but it is useful for and applicable to the optical measurement of various beam splitting elements.

(Embodiment 5)

In Embodiment 5 of the present invention, an optical measuring apparatus using a beam splitting element like those described in Embodiments 1 and 2 will be described.

In an optical measurement field, diffraction gratings are used in highly accurate measuring apparatuses as one kind of beam splitting elements. While taking an encoder, which is one of the more highly accurate measuring apparatuses, as an example, a diffraction grating is used for a scale that becomes a reference of measurement.

A used wavelength $\lambda$ of the diffraction grating used for the encoder approaches a grating period p as desired accuracy rises. At this time, since the intensity of diffracted light is varied depending on the polarized direction of the incident light that enters into the grating, an optical efficiency deteriorates. It was a problem that a signal to noise ratio of a signal obtained from the encoder deteriorated since difference between diffraction efficiencies arises depending on the polarized direction of the incident light as the accuracy of an optical measuring apparatus such as an encoder rises in this manner. The optical measuring apparatus according to this embodiment aims to solve such an issue by using the beam splitting element according to the present invention.

Figure 9:
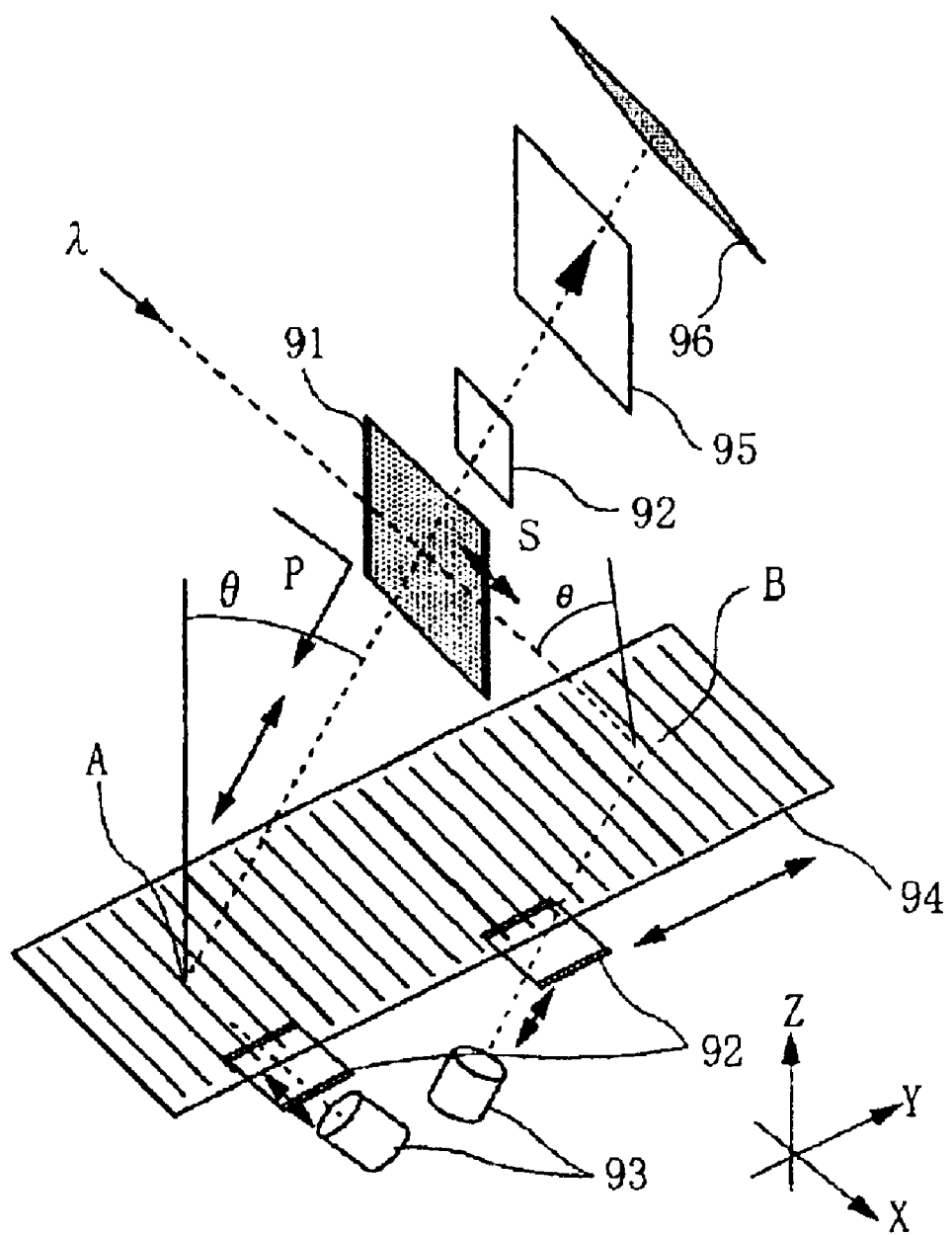
FIG. 9 is a schematic diagram of an optical measuring apparatus that uses a beam splitting element.

FIG. 9 is a schematic diagram of the optical measuring apparatus according to this embodiment. In FIG. 9, reference numeral 91 denotes a polarization beam splitter, numeral 92 shows a quarter-wave plate, numeral 93 shows a cat's-eye that is an optical element reflecting light in an incident direction, numeral 94 shows a scale composed of the beam splitting element according to Embodiments 1 and 2, numeral 95 shows a polarizing plate, and numeral 96 shows a photodetector.

The incident light $\lambda$ that is linearly polarized light is split into a P-polarized light and an S-polarized light after entering into the polarization beam splitter 91. The P-polarized light reflected by the polarization beam splitter 91 enters into point A of the scale 94 at an angle $\theta$, and the S-polarized light passing through the polarization beam splitter 91 enters into point B of the scale 94 at an angle $\theta$. Here, a diffraction grating constituting the scale 94 is set at such a grating pitch that only the first order diffracted light and the zero-th order diffracted light exist so as to satisfy Expression (4).

First order diffracted lights diffracted at points A and B become circularly polarized lights by entering into the quarter-wave plates 92 behind the scale 94, and are reflected by the cat's-eyes 93 to change to the linearly polarized lights from the circularly polarized lights by entering into the quarter-wave plates 92 again. At this time, the light that was the P-polarized light at the time of entering into the scale 94 changes to an S-polarized light, and the light that was the S-polarized light changes into a P-polarized light.

The light that changes from the P-polarized light to the S-polarized light is diffracted at point A of the scale 94 and enters into the polarization beam splitter 91 again. In addition, the light that changes from the S-polarized light to the P-polarized light is diffracted at point B of the scale 94 again and enters into the polarization beam splitter 91. In the polarization beam splitter 91, the S-polarized light diffracted at point A is transmitted, and the P-polarized light diffracted at point B is reflected to enter into the quarter-wave plate 92 while becoming interference signal light.

Here, it will be considered that the scale 94 shifts by one pitch in the plus Y direction. When the scale 94 shifts by one pitch at the plus Y direction, a phase of the luminous flux diffracted in point A advances by one cycle, and a phase of the luminous flux diffracted at point B is delayed by one cycle.

The lights reflected by the cat's-eyes 93 are returned to points A and B of the scale 94 again, whose phases are made additionally to advance and be delayed by one cycle respectively. The phase of the luminous flux diffracted at point A advances by two cycles in total, and the phase of the luminous flux diffracted at point B is delayed by two cycles.

When the interference signal light that the phases of these two P-polarized light and S-polarized light vary in the reverse directions mutually enters into the quarter-wave plate 92, it becomes the linearly polarized light rotating to enter into the polarizing plate 95. Since this linearly polarized light rotating becomes polarized light rotating by two revolutions when the scale moves by one pitch, it becomes four cycles of optical light-dark signal while looking through the polarizing plate 95. By detecting this light-dark signal by the photodetector 96, it is possible to measure the displacement amount of the scale 94, and consequently, to measure the displacement amount of a measuring object.

In this embodiment, the wavelength of incident light (used wavelength) is 785 nm, a period p of a diffraction grating constituting the scale 94 is 0.6 $\mu$m, an incident angle $\theta$ at which the incident light enters into the scale 94 is 40.857°, and quartz glass with a refraction index n of 1.45358 is used as the scale 94.

In general, it is known in the scalar theory of optics that a diffraction efficiency of the first order diffracted light of the two-step binary diffraction grating with periods in one direction (rectangular grating) becomes maximum at w/p= 0.5 and the diffraction efficiency is about 40%. Grating depth (step) d at that time is about 865 nm by using quartz glass. Though it is necessary to adopt the construction such as a blazed grating so as to enlarge the diffraction efficiency of the first order diffracted light more than this, plus/minus first order diffracted light is used in an optical system according to this embodiment, and hence, it is not possible to adopt blazed grating to increase the diffraction efficiency of only a specific order diffracted light.

Figure 10:
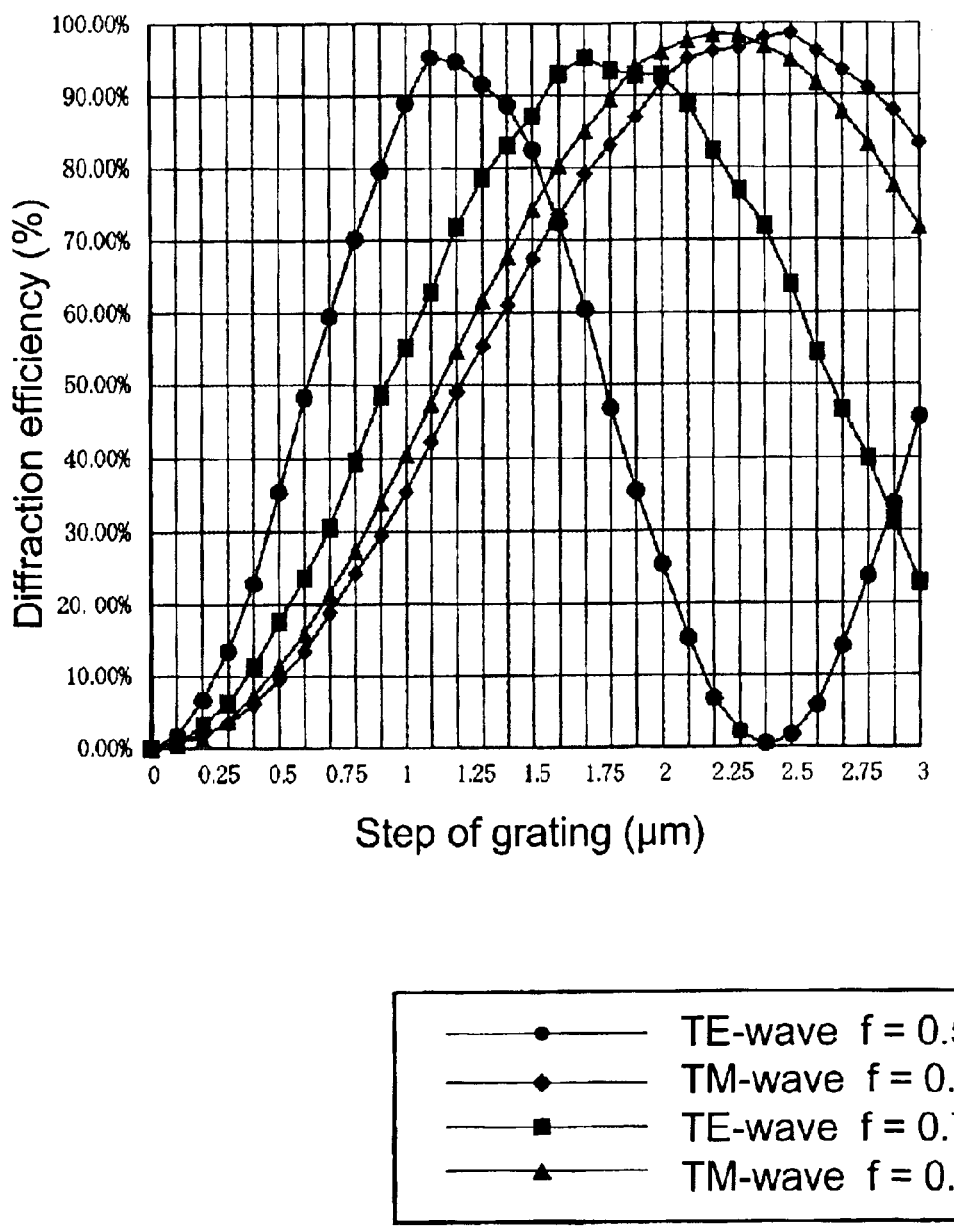
FIG. 10 is a graph showing the diffraction efficiency characteristic of a beam splitting element used in an optical measuring apparatus according to Embodiment 5 of the present invention.
Figure 11:
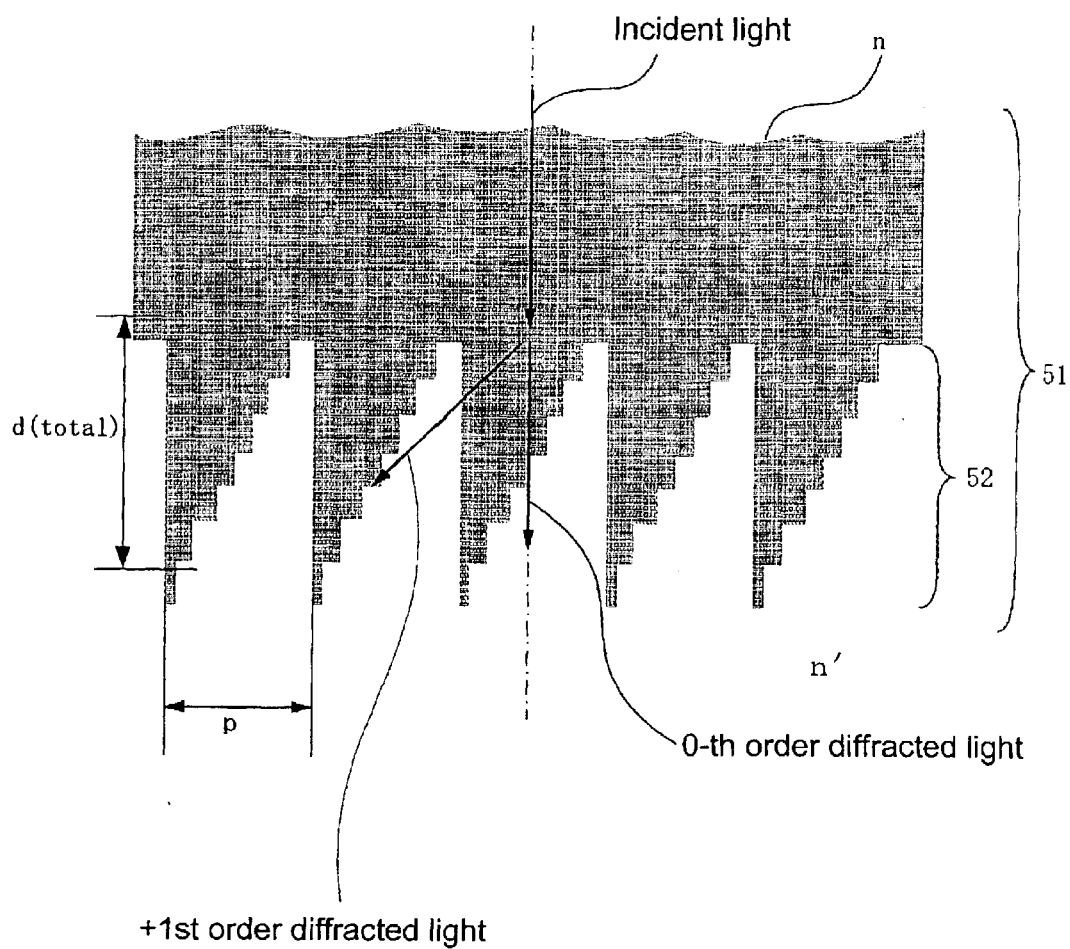
FIG. 11 is a sectional view of a conventional diffraction grating (eight-step multilevel)
Figure 12:
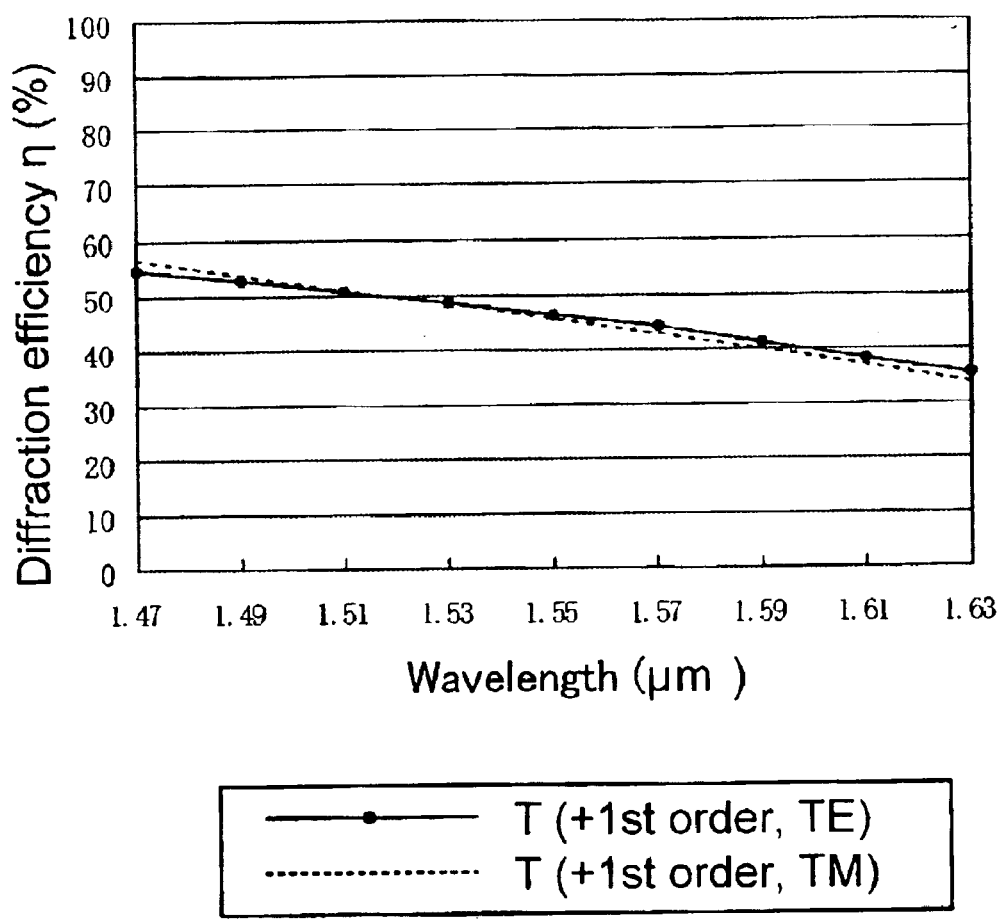
FIG. 12 is a graph showing an example of the conventional diffraction grating's wavelength characteristic of the diffraction efficiency relating to a plus first order diffracted light.
Figure 13:
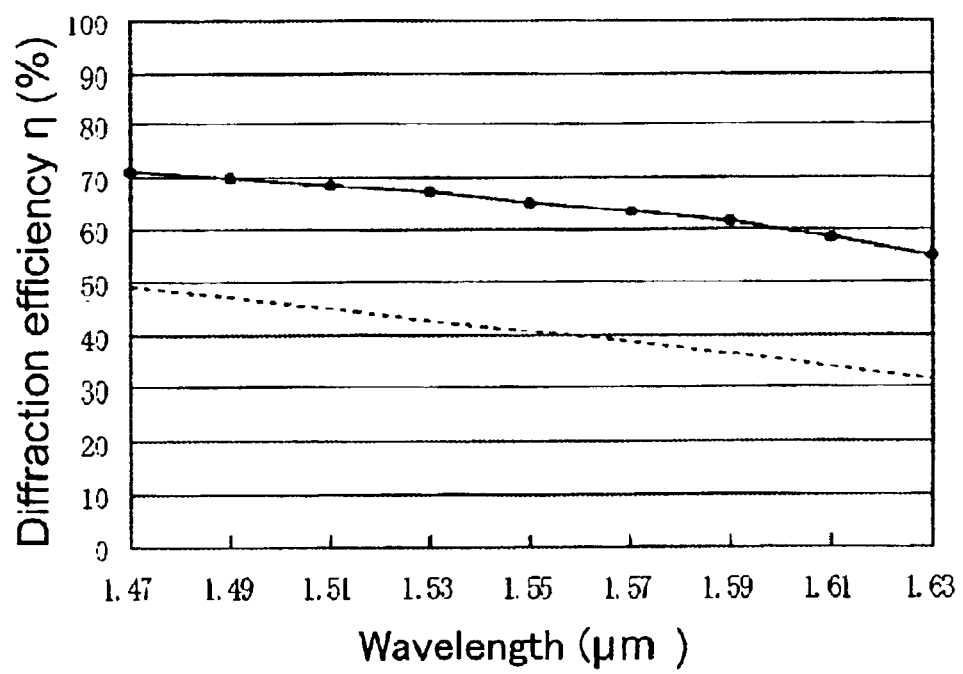
FIG. 13 is a graph showing another example of the conventional beam splitting element's wavelength characteristic of the diffraction efficiency relating to the plus first order diffracted light.

FIG. 10 is a graph showing the diffraction efficiency characteristic by the polarized direction of the incident light and w/p (=f) of the two-step binary diffraction grating with periods in one direction according to this embodiment. Since the polarization dependence of the diffraction efficiency becomes large at w/p=0.5 and d=865 nm that are obtained by optimizing grating construction according to the scalar theory, the diffraction efficiencies are about 75% in a TE polarized light, and 45% in a TM polarized light.

On the other hand, when w/p=0.7 and d=1.873 µm are adopted on the basis of the idea of the present invention, there is hardly the difference between diffraction efficiencies of the TE (P) polarized light and TM (S) polarized light, and moreover, it is possible to obtain a high diffraction efficiency that is 92.8%. At this time, n·d·w/p=1.91 holds, and hence, the conditional expression (3) is satisfied.

Owing to this, it becomes possible to achieve an encoder that has a high optical efficiency, has a good signal to noise ratio, and does not depend on a polarization characteristic. In addition, when the scale is constituted by a two-step binary diffraction grating with periods in one direction, production becomes simple, and hence, it becomes possible to produce the encoder at a low cost in good accuracy.

As described above, according to the present invention, it is possible to achieve a beam splitting element that has a combination of a high diffraction efficiency and low polarization dependence in comparison with a conventional diffraction grating and a hologram.

While preferred embodiments have been described, it is to be understood that modification and variation of the present invention may be made without departing from the sprit or scope of the following claims.

What is claimed is:

1. A beam splitting element comprising:
   a diffraction grating splitting an incident luminous flux into a plurality of luminous fluxes, wherein, the diffraction grating satisfies the following condition:

$$n \cdot d \cdot w/p \geq 0.670 \text{ } (\mu m)$$

where a refraction index of grating material is n, grating depth is d, a grating period is p, and grating width is w, the grating period p satisfies the following condition:

$$\lambda 0/(n \cdot \sin \theta + n') < p \leq 2 \cdot \lambda 0/(n \cdot \sin \theta + n')$$

where a design wavelength is $\lambda 0$, an incident angle is $\theta$, and a refraction index of an outgoing-side medium is n', and
   a section of the diffraction grating is substantially rectangular in shape, and a ratio w/p of the grating width w to the grating period p satisfies the following condition:

$$0.6 \leq w/p \leq 0.8.$$

2. The beam splitting element according to claim 1, wherein the diffraction grating is a two-step binary diffraction grating with periods in one direction.

3. The beam splitting element according to claim 1, wherein difference between diffraction efficiencies of incident light having a polarized direction in a plane parallel to the grating direction and incident light having a polarized direction perpendicular to it is within 10% at the design wavelength $\lambda 0$.

4. An optical demultiplexer comprising:
   the beam splitting element according to claim 1,
   wherein the beam splitting element splits an incident luminous flux into a plurality of luminous fluxes having different wavelengths.

5. A spectrophotometer comprising:
   the beam splitting element according to claim 1 and a photodetector,
   wherein the beam splitting element splits an incident luminous flux, exited from an optical member, into a plurality of luminous fluxes having different wavelengths and the photodetector detects one of the plurality of luminous fluxes for measuring an optical characteristic of the optical member.

6. An encoder comprising:
   a polarizing beam splitter splitting an incident luminous flux into two polarized lights with different polarized directions;
   a scale having the beam splitting element into which the two polarized lights enter; and
   a light-receiving element receiving interference light based on two polarized lights exited from the scale,
   wherein the beam splitting element comprises a diffraction grating splitting an incident luminous flux into a plurality of luminous fluxes,
   wherein, the diffraction grating satisfies the following condition:

$$n \cdot d \cdot w/p \geq 0.670 \text{ } (\mu m)$$

where a refraction index of grating material is n, grating death is d, a grating period is p, and grating width is w, and the grating period p satisfies the following condition:

$$\lambda 0/(n \cdot \sin \theta + n') < p \leq 2 \cdot \lambda 0/(n \cdot \sin \theta n')$$

where a design wavelength is $\lambda 0$, an incident angle is $\theta$, and a refraction index of an outgoing-side medium is n'.

7. A beam splitting element comprising a diffraction grating splitting an incident luminous flux into a plurality of luminous fluxes,
   wherein design parameters of the diffraction grating satisfy a conditional expression in which a product of a refractive index of grating material, grating depth and ratio of grating width to grating period equals or is bigger than a predetermined value, and
   wherein the grating period p satisfies the following condition:

$$\lambda 0/(n \cdot \sin \theta + n') < p \leq 2 \cdot \lambda 0/(n \cdot \sin \theta + n')$$

where $\lambda 0$ is a design wavelength, $\theta$ is an incident angle, and n' is a refraction index of an outgoing-side medium, and
   a section of the diffraction grating is substantially rectangular in shape, and a ratio w/p of the grating width w to the grating period p satisfies the following condition:

$$0.6 \leq w/p \leq 0.8.$$

8. The beam splitting element according to claim 7, wherein the predetermined value is 0.67 µm.

* * * * *